Jan. 1, 1924 1,479,215
A. J. BORST, JR
AUTOMOBILE TRAIN
Filed Aug. 14, 1919 6 Sheets-Sheet 3

Jan. 1, 1924.  1,479,215
A. J. BORST, JR
AUTOMOBILE TRAIN
Filed Aug. 14, 1919   6 Sheets-Sheet 6

Witness
Jacob Oberst, Jr.

Andrew J. Borst, Jr., Inventor.
By Emil Kulach
Attorney

Patented Jan. 1, 1924.

1,479,215

UNITED STATES PATENT OFFICE.

ANDREW J. BORST, JR., OF BUFFALO, NEW YORK.

AUTOMOBILE TRAIN.

Application filed August 14, 1919. Serial No. 317,582.

*To all whom it may concern:*

Be it known that I, ANDREW J. BORST, Jr., a citizen of the United States, residing at Buffalo, in the county of Erie, and State of New York, have invented certain new and useful Improvements in Automobile Trains, of which the following is a specification.

My invention relates to improvements in automobile trains, and more particularly to tractors and semi-trailers adapted to be attached thereto and the accessories and connections between the tractor and semi-trailer.

One of the objects of my invention is, to provide a coupling between the tractor and trailer whereby the trailer may be coupled to the tractor by backing the tractor toward and partly under the trailer while at any angle to the latter within an arc of a circle considerably greater than 180 degrees, in contradistinction to the usual method of connecting the trailer to the tractor which necessitates the tractor to be in direct line with the trailer.

Another object is, the provision of a substantial coupling wherein is employed a durable casting in which a spring-retained locking element is guided so as to prevent twisting strains on said locking element and to the end that the strain applied to said locking element is always in a straight line.

Another object is, to combine with the coupling mechanism between the tractor and trailer, automatic means whereby the trailer and tractor are instantly locked together, even before the coupling elements of the tractor and trailer reach their finally coupled positions.

Another object is, to provide a coupling between the tractor and trailer, which is automatic in action and so arranged that the tractor and trailer may be uncoupled from the driver's seat on the tractor.

Another object is, to provide an improved fifth wheel construction whereby the action between the trailer and the tractor is regulated in backing up, the fifth wheel connection between the tractor and trailer being such that these two vehicle units can be connected and disconnected at any angle; for example, if the tractor is disconnected on the left side, it or another similar tractor may be connected at the right side by merely moving the part of the fifth wheel construction on the trailer to the right.

A further object is, to provide means for steering the traction wheels of a semi-trailer from a suitable point of the tractor, and to automatically connect the part of the steering means on the tractor to the part on the trailer when coupling the trailer to the tractor.

A further object of my invention is to provide braking mechanism on the trailer and automatically connect the same with the braking mechanism on the tractor when coupling the two vehicle units together.

Further objects of my invention are to provide novel supporting mechanism at the front end of the trailer movable into operative or supporting position or into inoperative position, and to automatically brake the traction wheels of the trailer when moving said supporting mechanism into operative position.

With these and other objects in view, the invention consists in the novel features of construction, in the arrangement and combination of parts and mechanisms to be hereinafter described and more particularly pointed out in the subjoined claims.

In the drawings I have associated a tractor of particular form with a semi-trailer, and while I have shown a semi-trailer, so called for the reason that it has traction wheels only at the rear end and a pivoted support at its front end in order to support said front end when the semi-trailer is disconnected from the tractor, it is nevertheless my intention to employ certain features of this invention in what is generally termed a trailer; that is, a vehicle having traction wheels at the front as well as at the rear end and therefore wherein the specification and subjoined claims the term "trailer" is employed, it is intended to mean either a semi-trailer or a trailer, or both, as may be applicable.

In connection with the tractor and trailer, I employ brake mechanism, steering mechanism, and coupling mechanism, and such mechanisms and any others which are adaptable for use on tractors and trailers I refer to hereinafter in a generic sense as "serving mechanism" or "serving means".

Figures 15, 16:
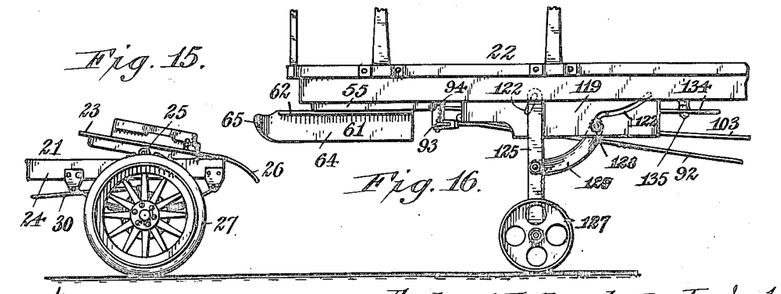
Fig. 15 is a side elevation of the rear end of the tractor showing the pivoted platform thereof in normal or rearwardly tilted position, the tractor being shown in such relation to Fig. 16 as it will assume when backing underneath the front end of the semi-trailer for coupling the latter to the tractor.
Fig. 16 is a side elevation of the front end of the semi-trailer showing the pivoted support in normal or operative position.

Referring now to the drawings in detail, the reference numeral 21 designates the tractor and 22 the trailer or, more particularly, semi-trailer. The tractor may be of any approved construction, but to the employment of my invention in its most advantageous form, I preferably provide a tilting platform 23, which is pivotally secured to the chassis 24 of the tractor, as at 25, the pivot being forward of the transverse center of said platform so that the platform normally is inclined rearwardly, as shown in Fig. 15, the rear end of said platform being curved downwardly, as at 26, for a purpose to appear hereinafter.

27 are the rear traction or driving wheels of the tractor, and 28 the front traction or steering wheels. The tractor is provided with the usual brake mechanism 29 operated in any approved manner. In the representative form shown, this brake mechanism includes brake rods 30 having connection at their front ends with brake arms 31 mounted on a rock shaft 32, to which shaft a brake lever 33 is secured, the brake rods being connected with the brake elements of the rear traction or driving wheels in the manner indicated at 34. The brake mechanism illustrated and described is one of many forms that may be employed on a tractor, and is merely shown and described to make clear the manner of connecting other operating parts of the automobile train thereto.

Figure 3:
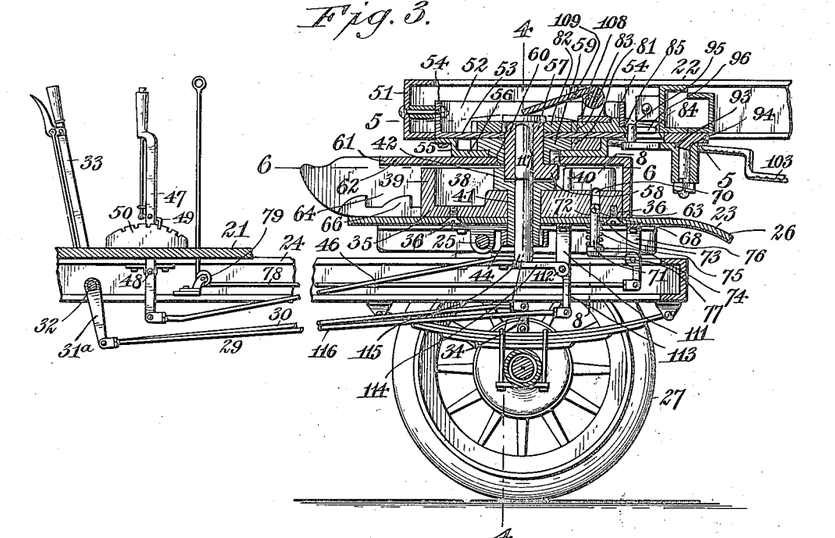
Fig. 3 is a longitudinal section through the connected ends of the tractor and semi-trailer, part of the tractor being broken away.
Figures 6, 7, 8:
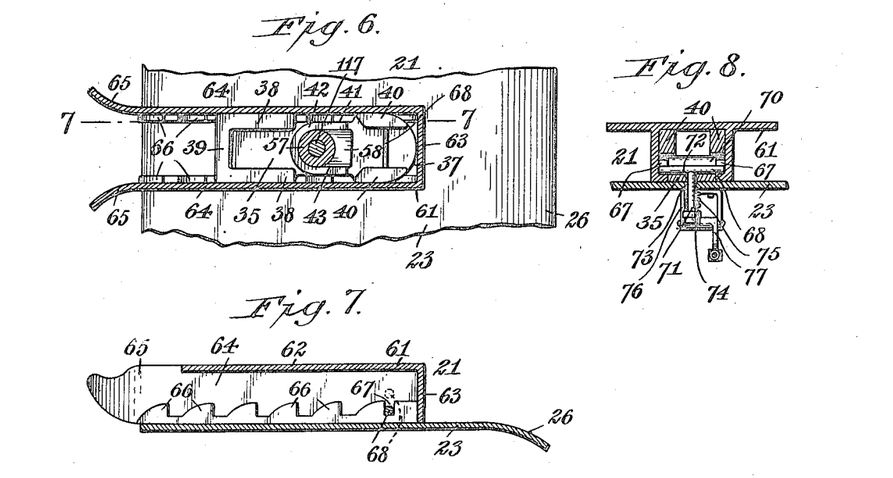
Fig. 6 is a horizontal section taken on line 6—6, Fig. 3.
Fig. 7 is a longitudinal section taken on line 7—7, Fig. 6, looking up.
Fig. 8 is a transverse section taken on line 8—8, Fig. 3.

On the tilting platform 23 a coupling member 35 is secured by means of screws 36, or otherwise. This coupling member, as clearly shown in Figs. 3, 6 and 8, is in the form of an elongated casting having its rear end rounded, as at 37, for a purpose to appear hereinafter. At its front end, said casting has upstanding spaced flanges 38 which are connected at their front ends by a transverse upstanding flange 39 and at the rear end of said casting two upstanding spaced flanges 40 are provided, the flanges 38 and 40 overhanging the sides of the casting, as clearly shown in Fig. 8.

Figure 4:
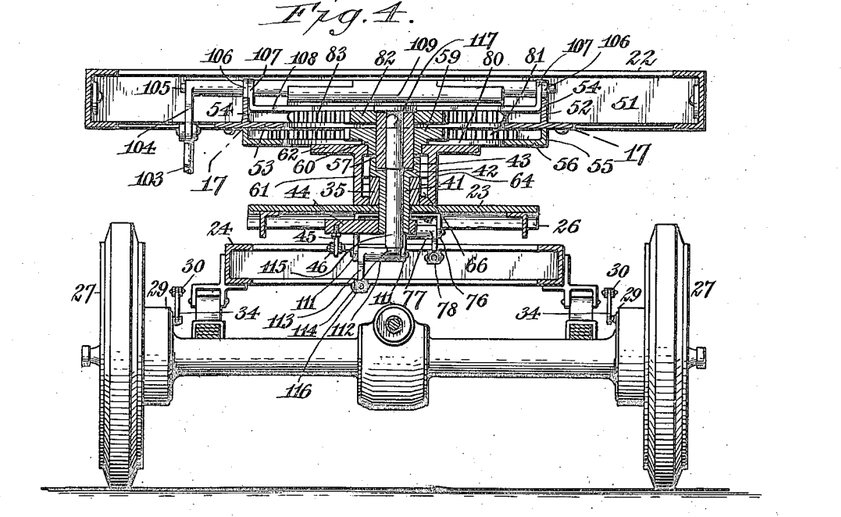
Fig. 4 is a transverse section taken on line 4—4, Fig. 3.

Journaled in the coupling member 35 and the tilting platform 23 is a steering connector 41, which is in the form of a sleeve vertically-disposed through said casting and platform and extending beneath the bottom of said platform, said sleeve being provided with a U-shaped head 42 having a U-shaped upwardly and rearwardly-opening depression or pocket 43. To the depending lower end of the sleeve of said steering connector 41 an actuator arm 44 is secured, said arm extending laterally in one direction and having a depending eye bolt 45 fastened thereto. A steering rod 46 has its rear end connected to said eye bolt, as best shown in Fig. 4, and its front end connected to a steering lever 47 which is pivoted, as at 48, and it also has detent mechanism 49 adapted to co-act with a notched sector 50. Said steering lever 47 is adapted to be swung on its pivot to actuate the steering rod 46, thereby moving the actuator arm 44 in an arc of a circle and causing the sleeve with its U- shaped head 42 to rotate within the coupling member 35 and the tilting platform 23. Secured to the chassis 51 of the semi-trailer is a supporting frame 52 which includes a flat plate 53 having an upstanding flange 54 around all sides thereof. Fastened to the under side of the supporting frame 52 is a pan-like sub-frame 55 having its flat bottom 56 spaced from the flat plate of the supporting frame 52, as clearly shown in Fig. 3.

Journaled for rotation in the supporting frame, and more particularly, in the flat plate 53 of said supporting frame, is a steering connector member 57 in the form of a sleeve having at its lower end a rearwardly-directed extension 58 adapted to fit into the U-shaped upwardly and rearwardly opening depression 43 of the steering connector 41 on the tractor. The extension 58, when taken in connection with the lower end of the sleeve of said steering connector member, may be said to be of horse-shoe or U-shape; that is, it conforms to the shape of the depression 43 in the steering connector 41 and fits snugly therein. Rotatable on the sleeve of said steering connector member 57 is a gear wheel 59 having a stepped hub 60, a portion of which is rotatable and transversely movable in the flat bottom 56 of the sub-frame 55.

Figure 5:
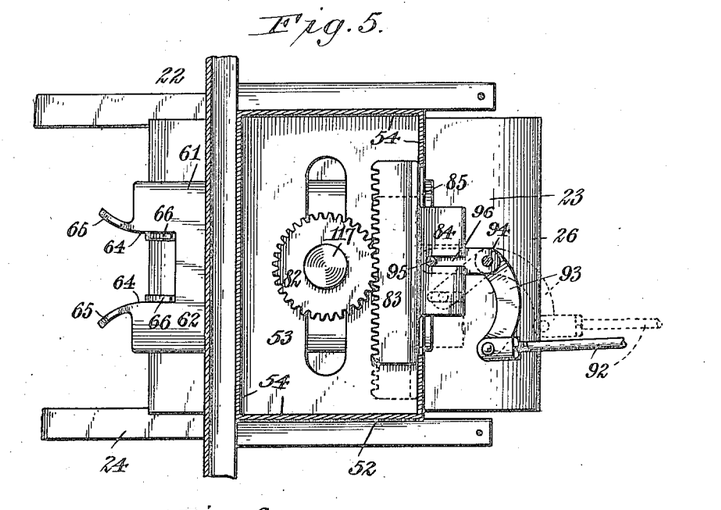
Fig. 5 is a horizontal section taken on line 5—5, Fig. 3.

Arranged underneath the sub-frame 55 is a second coupling member 61, which may be referred to as the trailer coupling member, while the coupling member 35 hereinbefore described, may be referred to as the tractor coupling member. Said second or trailer coupling member is preferably in the form of an elongated casting comprising a flat top plate 62, a depending cross web 63 at the rear end of said top plate and two parallel spaced flanges or rails 64 directed downwardly from said top plate and projecting forwardly from the front edge of the same, as at 65, the forwardly-projecting portions 65 being flared outwardly, as best shown in Figs. 5 and 6. These flanges may be termed "guide rails", since they are adapted to receive between them the coupling member 35 of the tractor. Said trailer coupling member 61 is rotatable on the sleeve of the steering connector member 57, it being keyed to the stepped hub 60 of the gear wheel 59. Consequently, when the tractor is connected to the trailer and the two coupling members are coupled together in the manner shown in Fig. 3, the trailer coupling member 61 will rotate on the sleeve of the steering connector member 57 when the tractor is turned at an angle to the trailer and at the same time the gear wheel 59 will be caused to rotate with said trailer coupling member. Locking mechanism is provided between the two coupling members 35 and 61, and this locking mechanism comprises a straight-lined series of ratchet teeth 66 formed on the inner or opposing faces of the two guide rails 64, said teeth being formed by increasing the thickness of said guide rails along the major portion of their lower edges to form ribs and notching said ribs along their upper edges. In said ribs at the rear end of the series of ratchet teeth 66, a lock notch 67 is provided, said notch having parallel sides, as clearly shown in Fig. 7.

Co-operating with the two series of ratchet teeth and the notches 67 is a spring-retained locking element 68 in the form of a double ended dog, preferably of T-shape. The head or transverse member of said dog is vertically movable in a transverse slot 70 formed in the coupling member 35 near the rear end thereof and the stem or vertical portion 71 of said dog extending downwardly through an opening 72 in said coupling member and through a registering opening 73 in the tilting platform 23. The lower end of the stem 71 is provided with a collar 74, and surrounding said stem between said collar and the under side of the tilting platform 23 is a coil spring 75 which serves to hold said spring-retained element or double ended dog in its lowermost position.

Secured to the under side of the tilting platform 23 is a bracket 76, to which an elbow lever 77 is pivotally connected, one arm of said elbow lever bearing against the extreme lower end of the stem of said dog 68, while the other arm of said lever is pivotally connected to a cable 78 extending forwardly therefrom and passing around a cable sheave or pulley 79 and thence upwardly to within convenient reach from the seat of the tractor. The elbow lever 77 and cable 78 may be termed "trailer releasing means."

It is to be noted that the head or transverse member of the spring-retained dog 68 extends from guide rail to guide rail of the trailer coupling member and normally is in the plane of the spaces between the ratchet teeth on said guide rails and of the lock notches 67; also that by reason of said dog being guided for vertical movement in the casting or coupling member of the tractor, all twisting strains thereon are entirely avoided.

Figures 18, 19:
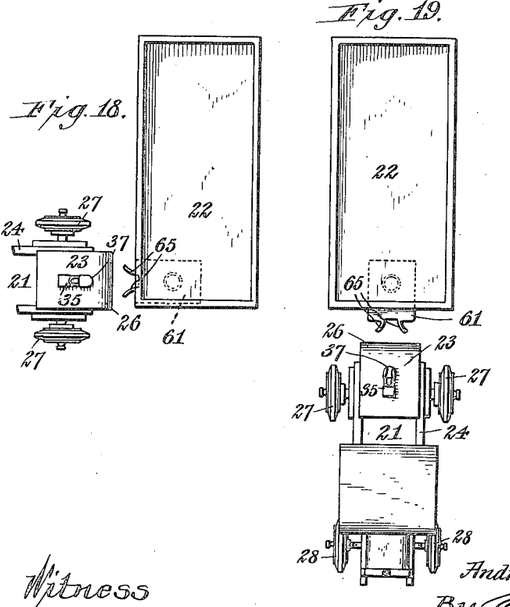
Fig. 18 is a diagrammatic view of the tractor and semi-trailer showing the coupling member of the semi-trailer arranged to permit the tractor to be coupled to the semi-trailer from the right thereof.
Fig. 19 is a diagrammatic view of the tractor and semi-trailer showing the two in a direct line indicating the position of the two when backing the tractor to bring the rear end thereof underneath the front end of the trailer for coupling the two together.
Figure 20:
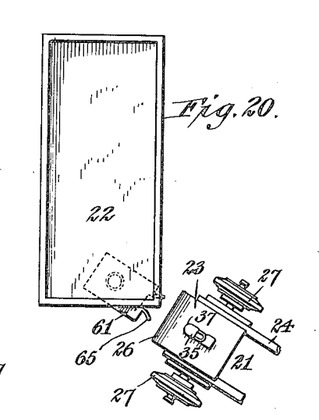
Fig. 20 is a diagrammatic view of the tractor and semi-trailer showing the coupling member of the semi-trailer at an angle between its longitudinal and direct transverse position indicating the position of the tractor and semi-trailer when coupling the two together at said angle.

With the tractor and trailer positioned as shown in Fig. 19, or with the tractor at any angle to the trailer and adapted to be coupled to said trailer, the rear end of the tractor is moved underneath the front end of the tractor, thereby positioning the tilting platform 23 underneath the front end of the trailer while the tractor coupling member 35 on said platform is directed into the trailer coupling member 61. It is of course apparent that a trailer or tractor capable of being coupled together or disconnected one from the other at any angle, permits the use of a trailer in comparatively small spaces or areas, and particularly around platforms of freight houses and similar structures, and it also enables the vehicle or automobile train to be conveniently handled in crowded places or where heavy traffic exists.

As the coupling member 35 of the tractor passes rearwardly into the coupling member 61 of the trailer, the opposite ends of the spring-retained dog 68 ride successively over the two series of ratchet teeth 66 on the guide rails and enter the successive spaces between said teeth and finally the lock notches 67, in which latter they are retained. When engaged with said lock notches, the centers on which said coupling members rotate are co-axial, as are the axes of the two steering connector members 41 and 57.

It is to be understood that in a semi-trailer such as shown in the drawings, the front end of the trailer is supported preparatory to coupling the tractor to the semi-trailer, the manner of supporting the same being hereinafter described. When the front end of the semi-trailer is supported preparatory to coupling the tractor thereto, the lower edges of the guide rails on the trailer coupling member 61 are in a plane beneath that in which the upper surface of the tilting platform 23 is when said platform is in horizontal or supporting position. Consequently, the rear portion of the platform, when tilted as shown in Fig. 15, will pass underneath the trailer coupling member until the outwardly-flared forwardly-projecting portions 65 of said trailer coupling member are engaged by the upper surface of said tilting platform, and it is here to be noted that said outwardly flared projecting portions or "horns," as they may be termed, have their lower and forward edges rounded so as to conveniently ride up onto the tilting platform, as the tractor is moved backward. During this action the front end of the semi-trailer is being slightly elevated and the platform passes rearwardly underneath the guide rails 64 until the rounded front end portions of said guide rails reach a point forward of the pivot 25 of said platform, when said platform will be moved into horizontal position with the full weight of the front end of the trailer distributed over said platform. During the entering movement of the tractor coupling member 35 into the trailer coupling member 61, the opposite ends of the dog 68 ride over the successive ratchet teeth, and for this reason the tractor becomes automatically locked to the trailer as soon as the first of each series of teeth is passed and before the tractor lifts the front end of the trailer. This is particularly desirable, when coupling the tractor to a trailer in hilly sections, since separation of the two vehicle units cannot take place except by manual actuation of parts connected with the coupling mechanism. With the dog and ratchet mechanism hereinbefore described, movement of the opposite ends of the spring-retained dog 68 over the ratchet teeth is continued until said ends ride over the last tooth of each of the series, when said ends will enter the lock notches 67 and hold the two coupling members in fully coupled position with the axes of both coincident.

It is to be noted that by flaring the horns or outer ends of the guide rails 64, and rounding the rear end of the coupling member 35, the two coupling members are automatically brought into coupling relation, even though they are not in alinement, one with the other.

Figure 17:
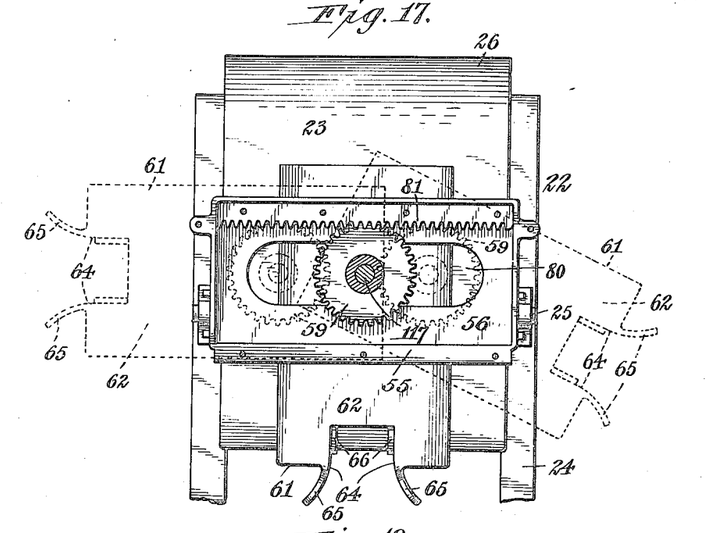
Fig. 17 is a horizontal section taken on line 17—17, Fig. 4.

In order that the stepped hub of the gear wheel 59 may rotate and be transversely movable within the flat bottom of the sub-frame, said bottom is provided with a transverse opening 80, as clearly shown in Fig. 17, and in moving transversely, the teeth of said gear wheel 59 mesh with and travel along a gear rack 81 fixed within the sub-frame at the rear thereof, thus when the tractor is turned at an angle to the trailer, the gear wheel 59 and the steering connector members 41 and 57 co-axial with said gear wheel may move laterally to change the position of the axes of the coupling members. By changing said axes in the manner described, the tipping of the trailer is prevented while connecting the tractor to the trailer when the two are at an angle to each other. Furthermore, by having the gear wheel 59 travel in contact with the gear rack 81 so as to change the centers of the coupling members or, as it may be termed in a broad sense, the center of the fifth wheel construction, the vehicle or automobile train may be turned in a small radius with absolute assurance that tipping of the trailer cannot take place.

The sleeve of the steering connector member 57 extends upwardly and is journaled for rotation in the flat plate 53 of the supporting frame 52 and it also projects above said plate, the projecting upper end thereof having a gear wheel 82 keyed or otherwise secured thereto, which is in mesh with a transversely-movable gear rack 83 guided for movement on the supporting frame 52 and having a rearward extension 84 passing through a guide slot 85 formed in the rear upstanding flange of said supporting frame, for a purpose to appear hereinafter.

Figure 1:
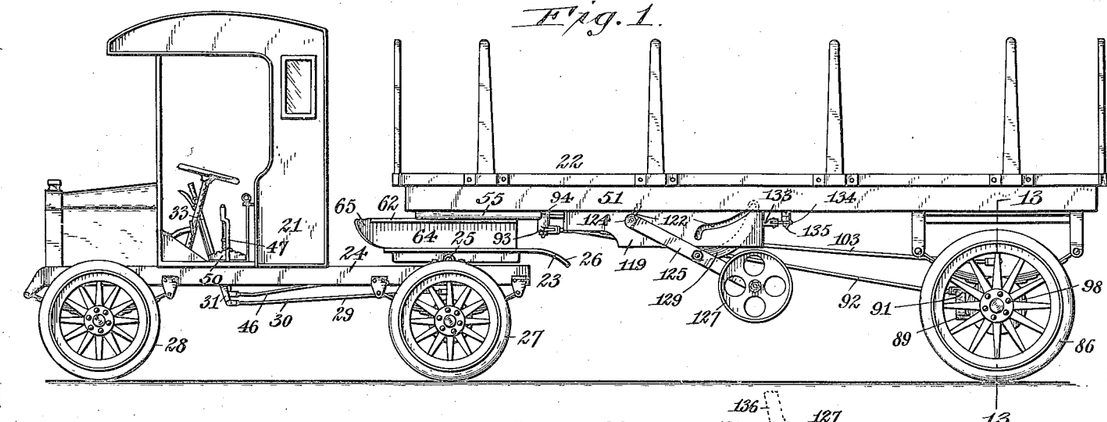
Fig. 1 is a side elevation of an automobile train comprising a tractor and a semi-trailer connected to said tractor.
Figure 2:
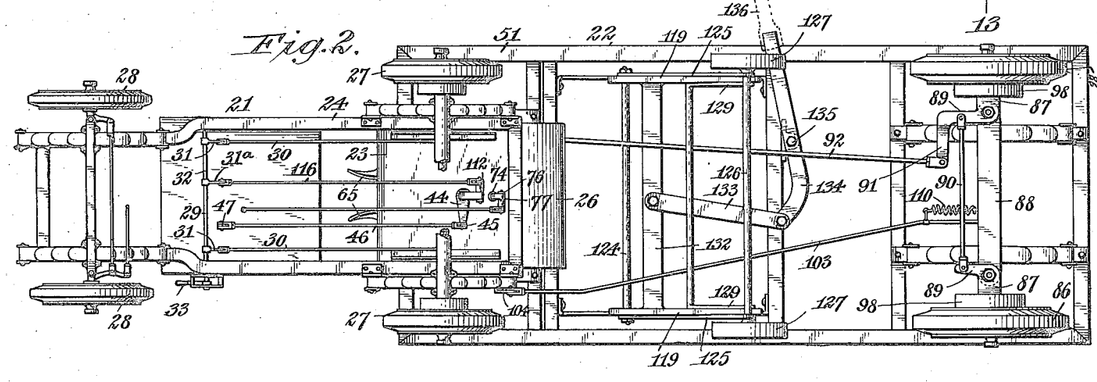
Fig. 2 is a plan view of the same.

The semi-trailer is provided at its rear end with combined supporting and steering wheels 86, said wheels being mounted on stub axles 87 pivotally secured to the ends of a fixed intermediate axle member 88. Said stub axles 87 have forwardly extending arms 89 connected by a connecting rod 90, one of said forwardly extending arms having an inwardly-directed extension 91, to the outer end of which a steering rod 92 is pivotally secured. Said steering rod 92 extends forwardly and has its forward end pivotally connected to one end of an angular arm 93 which is itself pivotally connected between its ends to the chassis of the trailer, as at 94. The other end of said angular arm 93 has an upstanding pin or stud 95 entered in a notch 96 formed in the rearward extension 84 of the transversely movable gear rack 83. When therefore the gear rack 83 is moved laterally in either direction (lateral movement in one direction being indicated by dotted lines in Fig. 5) by the gear wheel 82, the angular arm 93 is actuated and causes actuation of the steering rod 92, which in turn swings the stub axles 87 on their pivots, both stub axles operating in unison due to their being connected together by the connecting rod 90, as clearly shown in Fig. 2.

The combined supporting and steering wheels 86 of the trailer are provided with suitable brake elements (not shown), the elements being within brake drums 98, said brake elements being operated by a brake shaft 99 suitably journaled in brackets 100 secured to the fixed intermediate axle member 88. Opposite ends of said brake shaft are connected with the brake elements in the brake-drums 98 by means of universal joints 101, said joints permitting actuation of the brake elements regardless of the position to which the combined traction steering wheels 86 are turned, the universal joints having their vertical pivots co-axial with the pivots of the stub axles 87.

Secured to the brake shaft 99 is an arm 102, which has the rear end of a brake rod 103 pivotally connected thereto, the front end of said brake rod being pivotally connected to a crank arm 104 fastened to a shaft 105 journaled in lugs 106 rising from the opposite upstanding side flanges 54 of the supporting frame 52 and also in upstanding lugs 107 formed at opposite ends of a guide bar 108 spaced from the flat plate 53 of the supporting frame 52 and between which guide bar and said flat plate the transversely movable gear rack 83 is guided.

Secured to the shaft 105 is a covering element or transversely-extending member 109 in the form of a flap, elongated in the direction of said shaft. The brake rod 103 has one end of a retractile spring 110 secured thereto near its rear end, the other end of said spring being secured to one of the brackets 100 or to any other fixed point, said spring serving to draw and retain the brake rod in its rearmost position and thereby position the brake elements in normal or free position within the brake drums 98.

Secured to the under side of the tilting platform 23 are two spaced brackets 111, between which a pin actuator 112 is located, said pin actuator having a depending arm 113 and a forwardly-extending arm 114 against which latter the lower end of an actuator pin 115 bears, said actuator pin being retained axially within the steering connector member 41 of the tractor and serving as a pivot pin for said member 41. Pivotally connecting the lower end of the depending arm 113 with the lower end of a brake arm 31ᵃ on the rock shaft 32 is a brake rod 116, and by reason of said rock shaft 32 having the brake rods 30 of the tractor braking mechanism connected thereto, the actuator pin 115 is caused to be actuated when applying the brakes of the tractor. In other words, when the brake lever 33 is actuated, the brake mechanism of the tractor is applied and at the same time the pin actuator 112 is caused to be actuated so as to move the forwardly extending arm 114 upwardly, thereby lifting the actuator pin 115, which normally extends a distance below the lower end of said steering connector member, as clearly shown in Fig. 3. The steering connector member 57 has an actuator pin 117 arranged axially therein, said pin having an enlargement or head at its upper end which bears against the upper end of said last-mentioned steering connector member and the covering element or transversely extended member 109 or, as it is more particularly termed, the "flap" 109, bears against the upper surface of the enlargement or head of said pin. Consequently, when the actuator pin 115 within the steering connector member 41 of the tractor is elevated, it lifts the actuator pin within the steering connector member 57 of the trailer and causes the flap 109 to be elevated, said flap acting in the same manner as a crank arm so as to cause the shaft 105 to be rocked, which in turn swings the crank arm 104 forwardly and causes the brake rod 103 to be moved forwardly against the action of the retractile spring 110; thus, through the medium of the arm 102 and brake shaft 99, causing the brakes to be applied to the traction or steering wheels of the trailer.

It is to be noted that owing to the flap 109 covering a considerable area, or extending transversely over a considerable distance, and due to the fact that the co-axial actuator pins 115 and 117 are moved transversely with the steering connector members and the coupling members, the enlargement of the actuator pin 117 will under all conditions be retained in co-action with the flap or covering element 109 so that the brake mechanism of the trailer can be actuated regardless of the position in which the coupling members may be arranged. This is a decided advantage, due to the fact that the trailer brake mechanism may be applied when the tractor is at an angle to the trailer, fully as efficiently as when the tractor is in direct line with the trailer, even though the position of the tractor pins 115 and 117 is changed with respect to the covering element 109, as the covering element retains its operative relation with said actuator pins regardless of the position in which said pins may be placed.

The co-axial actuator pins 115 and 117 may be termed a sectional pivot or centering pin since parts are pivotally secured thereby and they provide an axis on which the trailer coupling member is centered.

When the semi-trailer is disconnected from the tractor, suitable supporting mechanism must be provided to support the front end of the trailer, and while the main features of the supporting mechanism herein shown are disclosed in my co-pending application, Serial No. 305,287, filed June 19, 1919, I deem it advisable to enter into detailed description sufficiently to illustrate the co-operative features of this supporting mechanism with the brake mechanism of the trailer.

In this supporting mechanism I employ two guide members 119, which are secured to opposite side members of the trailer chassis 51. Said guide members have inwardly-directed guide flanges 120 along their upper and lower edges. Lying against the inner sides of said guide members, with their edges in contact with said flanges, are actuator members 121. Each of the actuator members has actuator slots 123 formed therein, which may be termed "cam slots". The actuator or cam slots 123 co-operate with the guide slots 122 of the guide members, and passing through co-operating guide and actuator slots is a pivot rod 124 moved within guide slots of said guide member and actuated to move within said guide slots by co-operating cam slots within said actuator member.

Journaled to swing on said pivot rod 124 are two supporting legs 125 connected at their lower ends by an axle 126 on which supporting wheels 127 are journaled. Passing through other guide and cam slots in said guide members and actuator members is a pivot bolt 128 adapted to be moved from one end of each of said last-mentioned guide slots to the other by said cam slots, and pivotally secured to said pivot bolt are curved braces 129 which are pivotally secured to the supporting legs 125.

Figure 11:
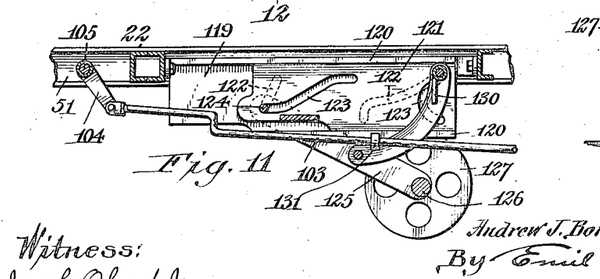
Fig. 11 is a similar section showing the pivoted support elevated.
Figure 12:
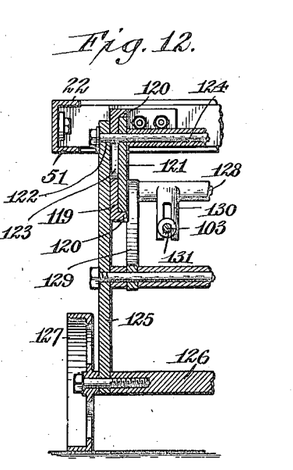
Fig. 12 is an enlarged transverse section taken on line 12—12, Fig. 10.
Figure 13:
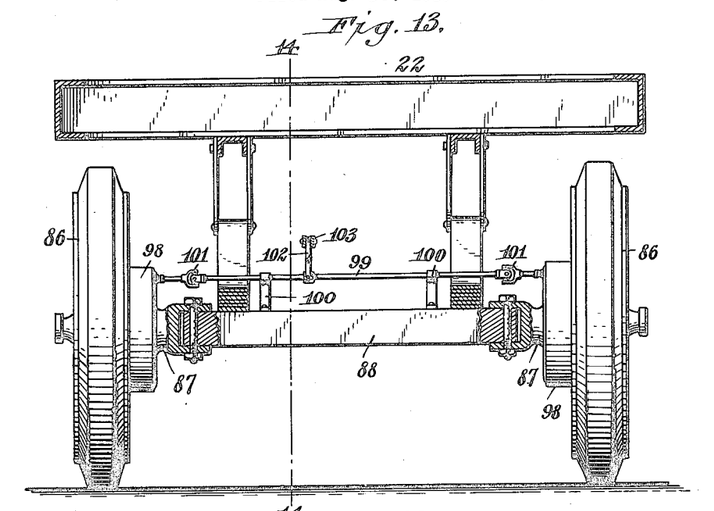
Fig. 13 is an enlarged transverse section taken on line 13—13, Fig. 1, the traction steering wheels of the semi-trailer being shown in elevation.
Figure 14:
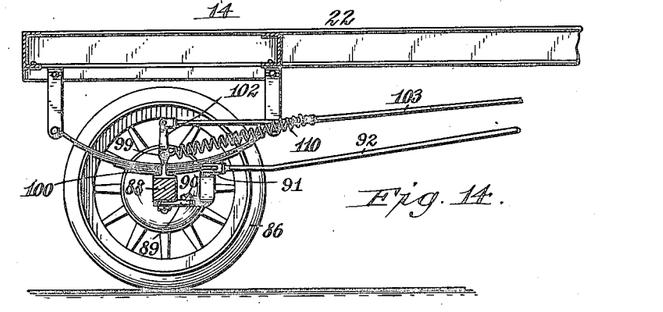
Fig. 14 is a longitudinal section on a reduced scale taken on line 14—14, Fig. 13.

Fastened to the pivot bolt 128 is a depending actuator fork 130 normally positioned, as shown in Fig. 11. When in this position the supporting legs are swung upwardly, as clearly shown in said figure.

Figure 10:
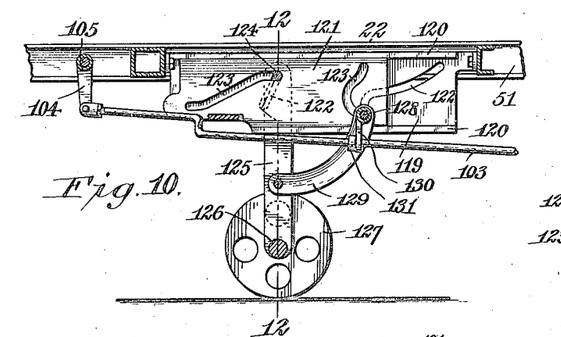
Fig. 10 is a longitudinal section on a reduced scale taken on line 10—10, Fig. 9.

When, however, it is desired to support the front end of the trailer by means of said supporting mechanism, the supporting legs 125 are swung downwardly into the position shown in Fig. 10, thus bringing the depending actuator fork 130 into a position to straddle the brake rod 103 and engage a collar 131 secured to said brake rod, thereby forcing said brake rod forwardly and setting the brakes of the trailer traction wheels when the supporting mechanism is lowered. The actuation of the brake rod causes the covering element or flap 109 to rise from the head of the actuator pin 117 without in any manner effecting co-operating parts of the combined tractor and trailer brake mechanism located on the tractor.

Figure 9:
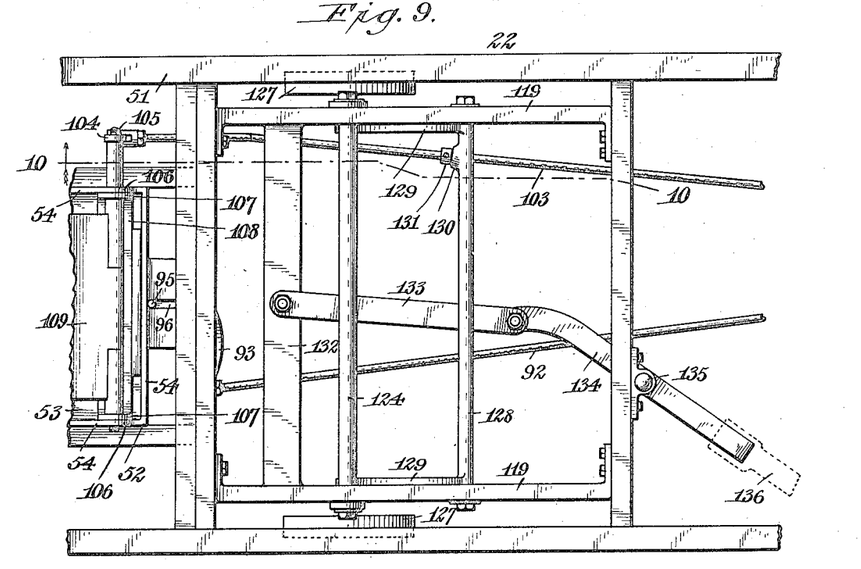
Fig. 9 is a plan view of a portion of the semi-trailer with the body removed therefrom.

When supporting the front end of the trailer preparatory to coupling the tractor to the trailer, the brakes on the wheels of the trailer will be applied, thus preventing movement of the trailer during the coupling action. The actuator members 121 are connected together by a cross bar 132, and midway between said actuator bars, a link 133 has one end thereof pivotally connected to said cross bar, the other end of said link being connected to an operating lever 134 pivoted between its ends, as at 135, to the chassis 51 of the semi-trailer, the opposite end of said operating lever extending rearwardly and laterally for convenient attachment thereto of a suitable handle, partly indicated by dotted lines at 136, Fig. 9, the handle being of sufficient length to conveniently manipulate the operating lever 134 so as to cause the actuator members 121 to move backward or forward along the guide members 119 and therefore swing the trailer supporting mechanism into operative or into inoperative position, as may be desired.

It is to be understood that the brake mechanism, steering mechanism, and the supporting mechanism for the trailer may be modified without departing from the spirit of my invention, and that various other changes may be resorted to without sacrificing any of the advantages of my invention that fall fully within the scope of the appended claims.

It is further to be understood that the serving mechanisms hereinbefore referred to, meaning the brake mechanisms, the steering mechanisms, the supporting mechanisms, and similar mechanisms, or parts thereof arranged respectively on connected vehicle parts or units, are merely representative of such mechanisms, and that substitute mechanisms may be employed in connection with certain parts of my invention; also that certain parts of my invention as herein described need not necessarily be used in connection with other parts in the particular manner disclosed herein, and that many changes in form, arrangement and combination in parts may be resorted to without departing from the principle involved.

Having thus described my invention, what I claim is:

1. The combination with a semi-trailer and a tractor adapted to be coupled to said semi-trailer, of dog and ratchet mechanism comprising two parts adapted to co-operate when coupling said tractor to said semi-trailer, said parts locking automatically to prevent separation of the tractor from the semi-trailer before being completely coupled.

2. The combination with two vehicle units, of a coupling member on one of said units comprising a swivel shoe having spaced rails, a pivot for said shoe, a gear wheel rotatable with said pivot, a transversely-disposed rack with which said gear wheel meshes, and a coupling member on the other unit adapted to be moved between said rails and be coupled thereto when moving said units together.

3. In combination, two vehicle units arranged to have the front end of one moved onto the rear end of the other and be supported thereby, a coupling member on each of said units for coupling said units together, a straight ratchet on one of said coupling members, and a spring-retained dog on the other adapted to co-act with said ratchet to prevent separation of said vehicle units until said coupling members reach their final coupling positions.

4. In combination, two vehicle units, and a coupling for connecting said units together comprising a swivel member on one side of the vehicle units having spaced guide rails and ratchet teeth on the inner sides of said guide rails, and a coupling member on the other unit adapted to enter said swiveled member between said guide rails and having a dog in co-action with the ratchet teeth of said rails.

5. The combination with a tractor and a semi-trailer, coupling means for coupling said tractor and trailer together, said trailer having steering wheels at its rear end, and actuating means for actuating said steering wheels from said tractor, said actuating means being operable through said coupling means.

6. The combination with a tractor and a semi-trailer connected with its front end to said tractor, steering wheels at the rear end of said semi-trailer, steering mechanism for said steering wheels partly on said tractor and partly on said trailer, and co-acting mechanism between the parts of said steering mechanism automatically connected together when connecting the semi-trailer to the tractor, whereby the semi-trailer is caused to be automatically directed in accordance with the course of said tractor.

7. The combination with a tractor and a semi-trailer, of coupling means having a single axis of rotation and pivotally connecting said tractor and semi-trailer, steering wheels for said trailer, steering mechanism for said trailer arranged in part on said tractor and in part on said trailer for controlling said steering wheels, and means passing through said coupling means actuated by the part of the steering mechanism on said tractor and adapted to actuate the part of the steering mechanism on said trailer.

8. The combination with two vehicle units, of serving mechanism for each of said units, and means between said mechanisms including a gear wheel having a movable center and a gear rack with which said gear wheel is in mesh, said means causing operation of one of said serving mechanisms when actuating the other.

9. The combination with two vehicle units, of coupling means for connecting said units including a swivel member on which one of said units swings and which member is transversely movable, a gear wheel on said member, a transversely movable gear rack in mesh with said gear wheel, steering wheels on one of said units, and steering mechanism for the steering wheels partly on each unit, the part of the steering mechanism on one unit having connection with said gear rack and the part of the steering mechanism on the other unit having connection with said swivel member.

10. The combination with two vehicle units, of coupling means for connecting said units together, said coupling means including a movable center allowing coupling or uncoupling of the units when in direct alinement or when at an angle to each other, steering wheels for each of said units, steering mechanism for the steering wheels of each of said units, the steering mechanism of one of said units being partly on each unit, and means whereby the steering wheels of one of said units are automatically positioned in proper relation to the steering wheels of the other unit.

11. The combination with two vehicle units, of coupling means for connecting said units together, and steering mechanism for one of said units in part on each of said units automatically brought into operative relation when moving said units together so that the part of the steering mechanism on one unit is operated when manually operating the part of the steering mechanism on the other unit.

12. The combination with two vehicle units, of means for coupling said units together including a transversely movable part, serving mechanism for each of said units, the serving mechanism of one of said units being adapted to actuate said transversely movable part, and an extended member with which said transversely movable part retains co-operation although moved from one position to another, said extended member being adapted to be actuated by said transversely movable part and having operative connection with the serving mechanism of the other unit.

13. The combination with two vehicle units, serving mechanism for each of said units, a member movable at an angle to a plane passing lengthwise through one of said units and adapted to be actuated by the serving mechanism of one of said units, and a covering element co-extensive with the range of movement of said movable part and having connection with the serving mechanism of the other unit.

14. The combination with a tractor, of a trailer having traction wheels at its rear end and a movable support at its front end, means for coupling the rear end of said tractor to the front end of said trailer, and brake mechanism for the traction wheels of said trailer adapted to be actuated from the tractor and also when moving said support.

15. The combination with a tractor, of a trailer having traction wheels at its rear end, a support at the front end of said trailer movable into operative or inoperative position, means for coupling the front end of said trailer to the rear end of said tractor, and brake mechanism for the traction wheels of said trailer adapted to be actuated from the tractor when moving said support into operative position.

16. The combination with two vehicle parts, of a coupling member secured to one of said parts and having spaced rails flared at one of their ends and provided with ratchet teeth along their inner sides, each rail having a notch provided with parallel sides, a coupling member for the other vehicle fitting between said rails, and a spring-actuated dog adapted to ride over said ratchet teeth with opposite ends and enter the parallel sided notches of said rails.

17. The combination with two vehicle parts, a coupling member secured to one of said vehicle parts and having two spaced series of ratchet teeth and a locking notch at one end of each series of teeth, a spring-pressed member having a portion spanning the space between said teeth and engaging the successive teeth of each series when coupling said vehicle parts together preparatory to engaging the locking notches of said coupling member.

18. The combination with two vehicle parts, of a coupling member secured to one of said parts and having spaced rails provided with ratchet teeth on opposing sides thereof, and a locking notch at the end of the teeth on each rail, and a coupling member secured to the other vehicle part and having a T-shaped spring-retained element arranged to have opposite ends of the head of said element engage said teeth and enter the lock notches on said rails.

19. The combination with two vehicle parts, of a coupling member on one of said parts having spaced depending rails equipped with outwardly projecting flared horns, each of said rails having a series of ratchet teeth and a locking notch at one end of each series of teeth, a coupling member on the other vehicle part adapted to be entered between said flanges and a spring-retained locking element carried by said last mentioned coupling member and adapted to successively engage the teeth on each of said rails when coupling said vehicle parts together so as to prevent separation of said vehicle parts during the coupling action, said spring-retained locking element being adapted to enter said locking notches after riding over said ratchet teeth.

20. The combination with two vehicle parts, of a coupling member on one of said parts, a tilting platform on the other part, and a coupling member secured to said tilting platform and adapted for connection with said first-mentioned coupling member, said coupling members having between them step by step locking mechanism.

21. The combination with two vehicle parts, of a coupling member secured to one of said vehicle parts and having a pair of spaced rails, corresponding ends of said rails being flared with the edges of said ends rounded, a tilting platform secured to the other vehicle part and normally inclined and a coupling member secured to said tilting platform and adapted to be entered between the rails of the first-mentioned coupling member, said coupling members having means to prevent accidental separation one from the other while being coupled together.

22. The combination with a tractor and a trailer, of a coupling member on said trailer having two spaced rails each provided with a lock notch, a coupling member on said tractor having a T-shaped spring-retained element whose head or transverse member is adapted for locking engagement with said lock notches and whose stem or vertical member is provided with an enlargement at its lower end, a spring engaging said enlargement for holding said T-shaped element in depressed or locking position, an elbow lever pivotally secured to said tractor and having one arm thereof engaging the under side of said T-shaped spring-retained element, and means for actuating said elbow lever from a distant point of said tractor.

23. The combination with two vehicle parts, of coupling members for connecting said parts together, a rotatable steering connector in each of said coupling members adapted for automatic connection one with the other when coupling said coupling members together, and steering mechanism partly on each of said vehicle parts, each part of said steering mechanism having connection with one of said rotatable steering connectors.

24. The combination with two vehicle parts, of a rotatable steering connector member on one of said vehicle parts having a depression therein, a rotatable connector member on the other vehicle part adapted to enter the depression of the first-mentioned connector member, and steering mechanism partly on each of said vehicle parts, each steering connector member having connection with the part of said steering mechanism on the corresponding vehicle part.

25. The combination with two vehicle parts, of coupling members for said vehicle parts adapted for coupling said vehicle parts together, a steering connector on one of said vehicle parts having a U-shaped depression, a steering connector member on the other vehicle part having a U-shaped portion adapted to fit said U-shaped depression, steering mechanism partly on each of said vehicle parts, the steering connector member of each vehicle part having operative connection with the part of the steering mechanism of the corresponding vehicle part.

26. The combination with a tractor and a trailer, of steering mechanism for said trailer in part on said tractor and in part on said trailer, coupling members for coupling said tractor and trailer together, and means to automatically connect the parts of said steering mechanism when coupling said coupling members together.

27. The combination with a tractor and a trailer, of steering mechanism for said trailer in part on said tractor and in part on said trailer, coupling members for connecting said tractor and trailer together, and rotatable steering connector members carried by said coupling members and adapted to be automatically connected when connecting said coupling members together, said rotatable steering members having connection respectively with the parts of the steering mechanism on said tractor and said trailer.

28. The combination with a tractor and a trailer, of steering mechanism for said trailer in part on said tractor and in part on said trailer, coupling members for connecting said tractor and trailer together, a rotatable element in each of said coupling members adapted for connection when connecting said coupling members, means for rotating one of said rotatable elements from a distant point of said tractor, and means actuated by the other rotatable element for actuating the part of the steering mechanism on the trailer.

29. The combination with a tractor and a trailer, of steering mechanism for said trailer in part on said tractor and in part on said trailer, a rotatable steering connector member on said tractor having a head at its upper end provided with a U-shaped depression, means for rotating said connector member when actuating the steering mechanism of said tractor, and a rotatable steering connector member on said trailer having a U-shaped lower end adapted to be entered in the U-shaped depression of said first-mentioned connector member, said second connector member being operatively connected with the part of the steering mechanism on said trailer.

30. The combination with two vehicle units, steering mechanism for one of said units having a part thereof arranged on each unit, a rotatable steering connector member on one of said vehicle units, an actuator arm secured to said connector member, operative connection between said actuator arm and the part of the steering mechanism on one of said vehicle units, a steering or connector member for the other vehicle unit adapted for connection with said first-mentioned steering connector member, and operative connection between said second steering connector member and the part of the steering mechanism on said other vehicle unit.

31. The combination with two vehicle units, of steering mechanism for one of said vehicle units in part on each vehicle unit, a steering connector member on each of said vehicle units adapted to be connected together when coupling said vehicle units together, means for rotating the steering connector member of one of said vehicle units when actuating the part of the steering mechanism on said vehicle unit, a gear wheel secured to the rotatable connector member of the other vehicle unit, a gear rack in mesh with said gear wheel, and connection between said gear rack and the part of the steering mechanism on said other unit.

32. The combination with a tractor and a trailer, of steering mechanism for said trailer in part on said tractor and in part on said trailer, a rotatable steering connector member on said tractor, means for rotating said steering connector member when actuating the part of the steering mechanism on said tractor, a rotatable steering connector member on said trailer having means of connection with said first-mentioned steering connector member, a gear wheel on the steering connector member of said trailer, a gear rack in mesh with said gear wheel and transversely movable on said trailer, said gear rack having a notch therein disposed at a right angle to the direction of movement of said gear rack, and an angular arm pivotally connected to said trailer and having a stud entering the notch of said gear rack, said angular arm having connection with the part of the steering mechanism on said trailer.

33. The combination with a tractor and a trailer, of steering mechanism for said trailer in part on said tractor and in part on said trailer, coupling members for coupling said tractor and trailer together and arranged for movement transversely with respect to said trailer, of rotatable steering connector members carried by said coupling members, means between the steering connector member of said trailer and the part of the steering mechanism of said tractor for causing rotation of said steering connector member when operating the part of the steering mechanism of said tractor, a gear wheel on the steering connector member of said trailer, a transversely-movable gear rack in mesh with said gear wheel, and connection between said gear rack and the part of the steering mechanism on said trailer.

34. The combination with a tractor, of a trailer having steering wheels at its rear end only, steering mechanism partly on said tractor and partly on said trailer for actuating said steering wheels including a steering rod extending forwardly underneath said trailer, coupling members for coupling said tractor and trailer together, steering connector members rotatable in said coupling members, operative connection between one of said steering connector members and the part of said steering mechanism on said tractor, and operative connection between the steering connector member of said trailer and said steering rod.

35. The combination with two vehicle units, of steering mechanism and brake mechanism for one of said vehicle units in part on each vehicle unit, coupling members for coupling said vehicle units together, steering connector members extending through said coupling members and having operative connection with the parts of the steering mechanism on both vehicle units whereby the part of the steering mechanism on one unit is caused to be operated when operating the part of the steering mechanism of the other unit, means passing through said steering connector members and having operative connection with the parts of the brake mechanism on both vehicle units whereby the part of the brake mechanism on one vehicle unit is caused to be operated when operating the part of the brake mechanism on the other unit.

36. The combination with two vehicle units, of brake mechanism and steering mechanism for one of said vehicle units arranged partly on each vehicle unit, means for coupling said vehicle units together, and connecting means for the two parts of the brake mechanism and the two parts of the steering mechanism on the two vehicle units adapted to be brought into operative relation when coupling said vehicle units together.

37. The combination with a tractor and a trailer, of steering and brake mechanisms for said trailer partly on said tractor and partly on said trailer, coupling members for coupling said tractor and trailer together, and co-axial means for connecting both the parts of the steering and brake mechanisms of the tractor and trailer so that when actuating the part of the steering or brake mechanism of the tractor the corresponding mechanism on the trailer will be caused to be actuated.

38. The combination with a tractor and a trailer, of steering and brake mechanisms for said trailer in part on said tractor and in part on said trailer, coupling members for coupling said tractor and trailer together, steering connector members carried by said coupling members and in operative connection with the part of the steering mechanism on said trailer, means carried by said steering connector members in operative relation to the part of the brake mechanism on said trailer, and selective means on said tractor for actuating either the steering connector members to cause operation of the part of the steering mechanism on said trailer or the brake connecting means for causing actuation of the part of the brake mechanism on said trailer.

39. The combination with a tractor and a trailer, of brake-mechanism for said trailer partly on said tractor and partly on said trailer, coupling members for coupling said tractor and trailer together, means permitting movement of the coupling member thereof transversely of said trailer, cooperating actuator pins extending through said coupling members, a transversely-extending member on said trailer adapted to engage the actuator pin in the coupling member of said trailer, operative connection between the part of the brake mechanism on said tractor and the actuator pin extending through the coupling member of said tractor, and operative connection between the transversely-extending member of the trailer and the part of the brake mechanism on said trailer.

40. The combination with a tractor and a trailer, of brake mechanism for said trailer in part on said tractor and in part on said trailer, a transversely-extending pivoted member on said trailer, operative connection between said transversely-extending member and the brake mechanism of said trailer, co-acting means on said tractor and trailer movable along said transversely extending member and adapted to actuate the same, and means for actuating said co-acting means when actuating the brake mechanism of said tractor.

41. The combination with a tractor and a trailer, of brake-mechanism for said trailer partly on said tractor and partly on said trailer, coupling members for coupling said tractor and trailer together, a vertically-movable actuator pin extending through the coupling member of said tractor, operative connection between said actuator pin and the part of the brake mechanism on said tractor, a vertically-movable actuator pin carried by the coupling member of said trailer and being alined with the first-mentioned actuator pin when said coupling members are coupled together, a movable covering element in contact with the upper end of said second-mentioned actuator pin, and means of connection between said covering element and the part of the brake mechanism on said trailer.

42. The combination with a tractor and a trailer, of brake-mechanism for said trailer partly on said tractor and partly on said trailer, said trailer having a transverse opening therein, coupling members for connecting said tractor and trailer together and adapted for changing positions with respect to the front end of said trailer, a vertically-movable actuator pin extending through the coupling member of said tractor, operative connection between said actuator pin and the part of the brake mechanism on said tractor, an actuator pin carried by the coupling member of said trailer and adapted to be axially alined with the actuator pin of said tractor when the coupling members of the tractor and trailer are coupled together, the actuator pin of said trailer being transversely movable through the transverse opening in said trailer, and a pivoted covering element retained in movable contact with the upper end of the actuator pin of said trailer, the part of the brake-mechanism on said trailer including a shaft to which said pivoted covering element is secured, a crank arm on said shaft, brake elements, and connections between said crank arm and said brake elements.

43. The combination with two vehicle units having serving mechanism thereon, of coupling members for connecting said vehicle units, rotatable connector members in said coupling members adapted to be connected together when coupling said coupling members together, and operative connection between the rotatable connector member of each unit and the serving mechanism of the same unit.

44. The combination with two vehicle units having serving mechanism thereon, of coupling members for coupling said vehicle units together, an actuator pin carried by each of said coupling members and adapted to be brought into alinement when said coupling members are coupled together, means for actuating the actuator pin of one unit when actuating the serving mechanism on said unit, and operative connection between the actuator pin of the other unit and the serving mechanism on said other unit, said last-mentioned actuator pin being actuated and causing actuation of the serving mechanism on said last-mentioned unit when actuating the serving mechanism on said first-mentioned unit.

45. The combination with two vehicle parts connected together, brake mechanism for one of said vehicle parts arranged partly on both vehicle parts, alined actuator pins, a pivoted pin actuator engaging one end of one of said pins, operative connection between said pivoted pin actuator and the part of the brake mechanism on one of said vehicle parts, a pivoted element engaging one end of the other actuator pin, and operative connection between said pivoted pin and the part of the brake mechanism on the other vehicle part.

46. The combination with two vehicle units having each serving mechanism thereon, co-acting elements on said vehicle units when connected together, said co-acting elements serving as the means on which one of said units swings and being arranged for movement transversely of said vehicle unit, said co-acting elements being operated when actuating the serving mechanism on one of said units, and means between said co-acting elements and the serving mechanism of the other unit for actuating said last mentioned serving mechanism, said co-acting elements being movable with respect to said means but being retained at all times in operative relation thereto.

47. The combination with a tractor and a trailer, of steering mechanism for said trailer in part on said tractor and in part on said trailer, a supporting frame on said trailer having a transverse opening, a gear rack transversely movable on said supporting frame and having operative connection with the part of the steering mechanism on said trailer, co-axial rotatable steering connector members, one of said steering connector members extending through the slot of said transverse frame, a gear wheel secured to said last-mentioned steering connector member and being in mesh with said gear rack, and operative connection between the other steering connector member and the part of the steering mechanism on said tractor.

48. The combination with a tractor and a trailer, of steering mechanism for said trailer in part on said tractor and in part on said trailer, a supporting frame on said trailer having a transverse slot, a sub-frame carried by said supporting frame and having a transverse slot in line with the transverse slot of said supporting frame, coupling members for coupling said tractor and said trailer together, one of said coupling members being carried by said supporting frame, steering connector members passing through said coupling members and being connected together when said coupling members are coupled together, one of said steering connector members extending through the slots of said supporting frame and sub-frame, means for operating said steering connector members when operating the part of the steering mechanism on said tractor, a gear wheel rotatable on one of said steering connector members, a fixed gear rack on said sub-frame having the said gear wheel in mesh therewith, said gear wheel having a hub extending into the transverse slot of said sub-frame and being keyed to one of said coupling members, a second gear wheel secured to said last-mentioned connector member, a transversely-movable gear rack in mesh with said second gear wheel, and operative connection between said transversely-movable gear rack and the part of the steering mechanism on said trailer.

49. The combination with a tractor and a trailer, of a coupling member for said tractor, and a coupling member for said trailer, said coupling members being adapted to couple said tractor and trailer together, of a fixed gear rack carried by said trailer, centering mechanism extending through said coupling members and including a gear wheel fastened to the coupling member of said trailer and in mesh with said gear rack whereby said gear wheel is caused to be rotated so as to travel along said gear rack when turning the tractor with respect to the trailer and changing the angularity of said coupling members with respect to said trailer.

50. In combination, a tractor, a trailer, coupling mechanism for coupling said tractor and trailer together, steering mechanism for said trailer partly on said tractor and partly on said trailer, and braking mechanism for said trailer partly on said tractor and partly on said trailer, said steering and braking mechanisms being brought into co-operating relation when said tractor and trailer are coupled together.

51. In an antomobile train, the combination with a plurality of units coupled together, and serving mechanisms on each of said units automatically brought into co-operating relation when said units are coupled together.

In testimony whereof I affix my signature.

ANDREW J. BORST, Jr.